US010124252B2

(12) United States Patent
Grant

(10) Patent No.: US 10,124,252 B2
(45) Date of Patent: Nov. 13, 2018

(54) PROGRAMMABLE HAPTIC PERIPHERAL

(71) Applicant: Immersion Corporation, San Jose, CA (US)

(72) Inventor: Danny A. Grant, Laval (CA)

(73) Assignee: IMMERSION CORPORATION, San Jose, CA (US)

( * ) Notice: Subject to any disclaimer, the term of this patent is extended or adjusted under 35 U.S.C. 154(b) by 69 days.

(21) Appl. No.: 15/419,953

(22) Filed: Jan. 30, 2017

(65) Prior Publication Data

US 2017/0203206 A1 Jul. 20, 2017

Related U.S. Application Data

(63) Continuation of application No. 14/213,034, filed on Mar. 14, 2014, now Pat. No. 9,557,830.

(60) Provisional application No. 61/789,566, filed on Mar. 15, 2013.

(51) Int. Cl.

| G06F 9/24 | (2006.01) |
|---|---|
| A63F 13/285 | (2014.01) |
| G06F 3/0338 | (2013.01) |
| G06F 3/01 | (2006.01) |
| A63F 13/24 | (2014.01) |
| G05G 9/047 | (2006.01) |

(52) U.S. Cl.
CPC ............ *A63F 13/285* (2014.09); *A63F 13/24* (2014.09); *G05G 9/047* (2013.01); *G06F 3/016* (2013.01); *G06F 3/0338* (2013.01); *A63F 2300/302* (2013.01); *G05G 2009/04766* (2013.01); *G06F 2203/015* (2013.01)

(58) Field of Classification Search
None
See application file for complete search history.

(56) References Cited

U.S. PATENT DOCUMENTS 5,396,266 A * 3/1995 Brimhall ............. F15B 13/0422
335/215
5,691,898 A * 11/1997 Rosenberg ............ A63F 13/285
345/161

(Continued)

FOREIGN PATENT DOCUMENTS

| CN | 1444758 A | 9/2003 |
| WO | 01/91100 A1 | 11/2001 |

OTHER PUBLICATIONS

EP Search Report, EP Application 17156662.3, dated Jul. 4, 2017.
First Office Action issued in corresponding Chinese Application No. 2014100991273, dated Jun. 19, 2018.

*Primary Examiner* — Paul A D'Agostino
(74) *Attorney, Agent, or Firm* — Medler Ferro Woodhouse & Mills PLLC

(57) ABSTRACT

A system includes a host computer, a processor, and a haptic peripheral. The haptic peripheral includes a manipulandum movable in at least one degree of freedom, an inertial haptic output device, and a haptic output device. The inertial haptic output device is coupled to the manipulandum, and is configured to receive a control signal from the processor and output a transient haptic effect to the manipulandum in response to the control signal from the processor. The haptic output device is configured to receive a control signal from the processor and modify the stiffness of the manipulandum in response to the control signal from the processor.

14 Claims, 11 Drawing Sheets

(56) References Cited

U.S. PATENT DOCUMENTS

| | | | |
|---|---|---|---|
| 5,959,613 A * | 9/1999 | Rosenberg | A63F 13/06 341/20 |
| 6,004,134 A * | 12/1999 | Marcus | A63F 13/06 345/161 |
| 6,154,198 A * | 11/2000 | Rosenberg | A63F 13/06 345/156 |
| 6,342,880 B2 * | 1/2002 | Rosenberg | A63F 13/06 345/156 |
| 6,354,945 B1 | 3/2002 | Furuki et al. | |
| 6,400,352 B1 * | 6/2002 | Bruneau | G05G 9/047 345/156 |
| 6,801,008 B1 * | 10/2004 | Jacobus | B25J 9/1689 318/560 |
| 7,061,466 B1 * | 6/2006 | Moore | F16F 6/00 345/156 |
| 7,336,266 B2 * | 2/2008 | Hayward | G06F 3/03547 178/18.05 |
| 7,567,232 B2 * | 7/2009 | Rosenberg | G06F 3/016 200/512 |
| 8,063,893 B2 * | 11/2011 | Rosenberg | A63F 13/06 345/173 |
| 8,545,323 B2 * | 10/2013 | McVicar | A63F 13/06 345/161 |
| 8,717,152 B2 * | 5/2014 | Bhatia | G06F 3/016 340/407.1 |
| 2006/0109266 A1 * | 5/2006 | Itkowitz | G06F 3/016 345/419 |
| 2006/0267932 A1 * | 11/2006 | Rosenberg | A63F 13/06 345/156 |
| 2008/0055241 A1 | 3/2008 | Goldenberg et al. | |
| 2008/0132313 A1 * | 6/2008 | Rasmussen | G07F 17/32 463/16 |
| 2008/0318679 A1 * | 12/2008 | Tran | A43B 3/0005 463/39 |
| 2010/0311494 A1 * | 12/2010 | Miller | A63F 1/18 463/22 |
| 2010/0312625 A1 * | 12/2010 | Miller | A63F 1/02 705/14.5 |
| 2011/0021272 A1 * | 1/2011 | Grant | A63F 13/10 463/30 |
| 2011/0050405 A1 * | 3/2011 | Hollis, Jr. | G06F 3/016 340/407.2 |
| 2011/0111852 A1 * | 5/2011 | Cohen | G07F 17/32 463/37 |
| 2011/0244963 A1 * | 10/2011 | Grant | G06F 3/011 463/37 |
| 2012/0302323 A1 * | 11/2012 | Gagner | G07F 17/3202 463/25 |
| 2013/0257602 A1 * | 10/2013 | Higbie | G08B 6/00 340/407.2 |
| 2014/0004941 A1 * | 1/2014 | Christopher Watson | A63F 13/355 463/31 |
| 2014/0004949 A1 * | 1/2014 | Miura | A63F 13/10 463/37 |
| 2014/0094310 A1 * | 4/2014 | Bleich | A63F 13/02 463/38 |
| 2014/0274398 A1 * | 9/2014 | Grant | G06F 3/0338 463/37 |
| 2015/0133221 A1 * | 5/2015 | Danny | A63F 13/92 463/37 |
| 2016/0077671 A1 * | 3/2016 | Wagner | G06K 9/00355 345/175 |

* cited by examiner

PROGRAMMABLE HAPTIC PERIPHERAL

CROSS-REFERENCE TO RELATED APPLICATIONS

This application claims the benefit of U.S. patent application Ser. No. 14/213,034, filed Mar. 14, 2014 and granted as U.S. Pat. No. 9,557,830 on Jan. 31, 2017, which claims priority to U.S. Provisional Patent Application Ser. No. 61/789,566, filed Mar. 15, 2013, both of which are hereby incorporated by reference in their entirety for all purposes.

FIELD OF THE INVENTION

Embodiments hereof relate generally to peripheral devices for interfacing with computer devices, and more particularly to systems and methods for providing haptic effects or feedback to such peripheral devices.

BACKGROUND OF THE INVENTION

Video games and virtual reality systems have become even more popular due to the marketing toward, and resulting participation from, casual gamers. In a typical implementation, a computer system displays a visual environment to a user on a display device. Users can interact with the displayed environment by inputting commands or data from the interface device. The computer updates the environment in response to the user's manipulation of a moved manipulandum such as a joystick handle and provides visual feedback to the user using the display screen.

Conventional video game devices or controllers use visual and auditory cues to provide feedback to a user. In some interface devices, kinesthetic feedback (such as active and resistive haptic feedback) and/or tactile feedback (such as vibration, texture, and heat) is also provided to the user, more generally known collectively as "haptic feedback" or "haptic effects." Haptic feedback can provide cues that enhance and simplify the user interface. For example, vibration effects, or vibrotactile haptic effects, may be useful in providing cues to users of electronic devices to alert the user to specific events, or provide realistic feedback to create greater sensory immersion within a simulated or virtual environment. Conventional haptic feedback systems for gaming and other devices generally include an actuator for generating the haptic feedback attached to the housing of the controller/peripheral. More particularly, motors or other actuators of the interface device are housed within the controller and are connected to the controlling computer system. The computer system receives sensor signals from the interface device and sends appropriate haptic feedback control signals to the actuators. The actuators then provide haptic feedback to the controller. The computer system can thus convey physical sensations to the user in conjunction with other visual and auditory feedback.

One problem occurring in commercially-available implementations of haptic feedback devices is that the devices are very bulky because such devices employ large motors and require large power supplies to operate. These features make it difficult to integrate compelling haptic feedback into a smaller interface device such as a handheld gamepad, joystick, remote control, or other device. Yet, these controllers are preferred input devices for many types of systems, especially home video game consoles, and are also preferred by many consumers. Embodiments hereof relate to integrating haptic feedback into a smaller interface device such as a handheld peripheral for a gaming system.

BRIEF SUMMARY OF THE INVENTION

Embodiments hereof relate to a haptic peripheral including a manipulandum, an adjustable bumper, and a haptic output device coupled to the adjustable bumper. The manipulandum is movable in at least one degree of freedom. The haptic output device is configured to receive a control signal from the processor and is configured to move the adjustable bumper relative to the manipulandum in order to modify a stiffness of the manipulandum in response to the control signal from the processor.

Embodiments hereof also relate to a gaming system including a host computer, a processor, and a haptic peripheral. The haptic peripheral includes a manipulandum movable in at least one degree of freedom, an inertial haptic output device, and a haptic output device. The inertial haptic output device is coupled to the manipulandum, and is configured to receive a control signal from the processor and output a transient haptic effect to the manipulandum in response to the control signal from the processor. The haptic output device is configured to receive a control signal from the processor and modify a stiffness of the manipulandum in response to the control signal from the processor.

Embodiments hereof also relate to a method of providing haptic feedback. The method includes the steps of receiving a first control signal at a haptic peripheral, wherein the haptic peripheral includes a manipulandum movable in at least one degree of freedom and a haptic output device. The first control signal is transmitted to the haptic output device. A stiffness of the manipulandum is modified in response to the first control signal.

BRIEF DESCRIPTION OF DRAWINGS

The foregoing and other features and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION OF THE INVENTION

Specific embodiments of the present invention are now described with reference to the figures, wherein like reference numbers indicate identical or functionally similar elements.

The following detailed description is merely exemplary in nature and is not intended to limit the invention or the application and uses of the invention. Furthermore, there is no intention to be bound by any expressed or implied theory presented in the preceding technical field, background, brief summary or the following detailed description. Furthermore, although the following description is directed to gaming devices and controllers for gaming devices, those skilled in the art would recognize that the description applies equally to other devices having user input elements.

Figure 1:
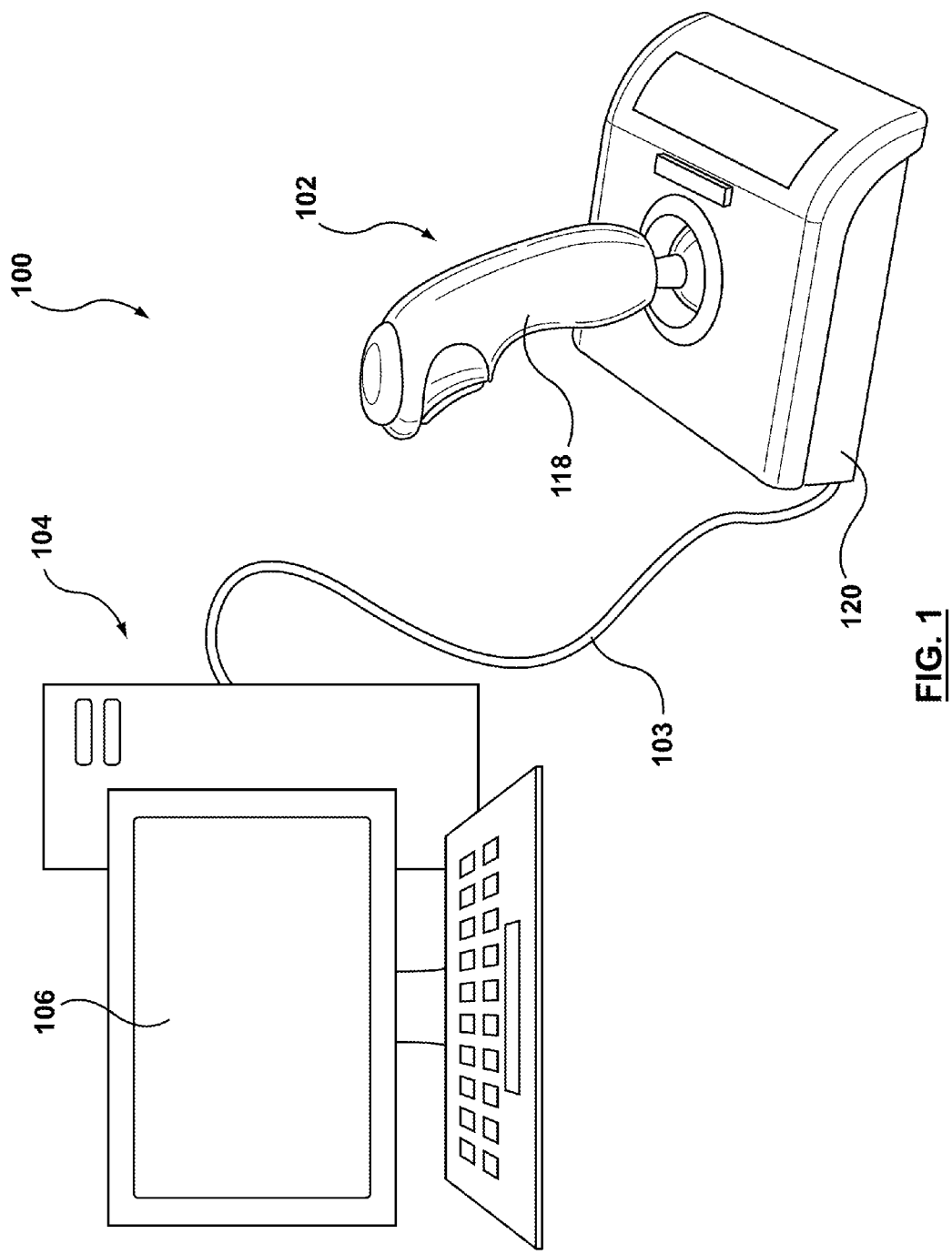
FIG. 1 is an illustration of a system for providing haptic feedback to a haptic peripheral according to an embodiment hereof, wherein the haptic peripheral is a haptic joystick.
Figure 2:
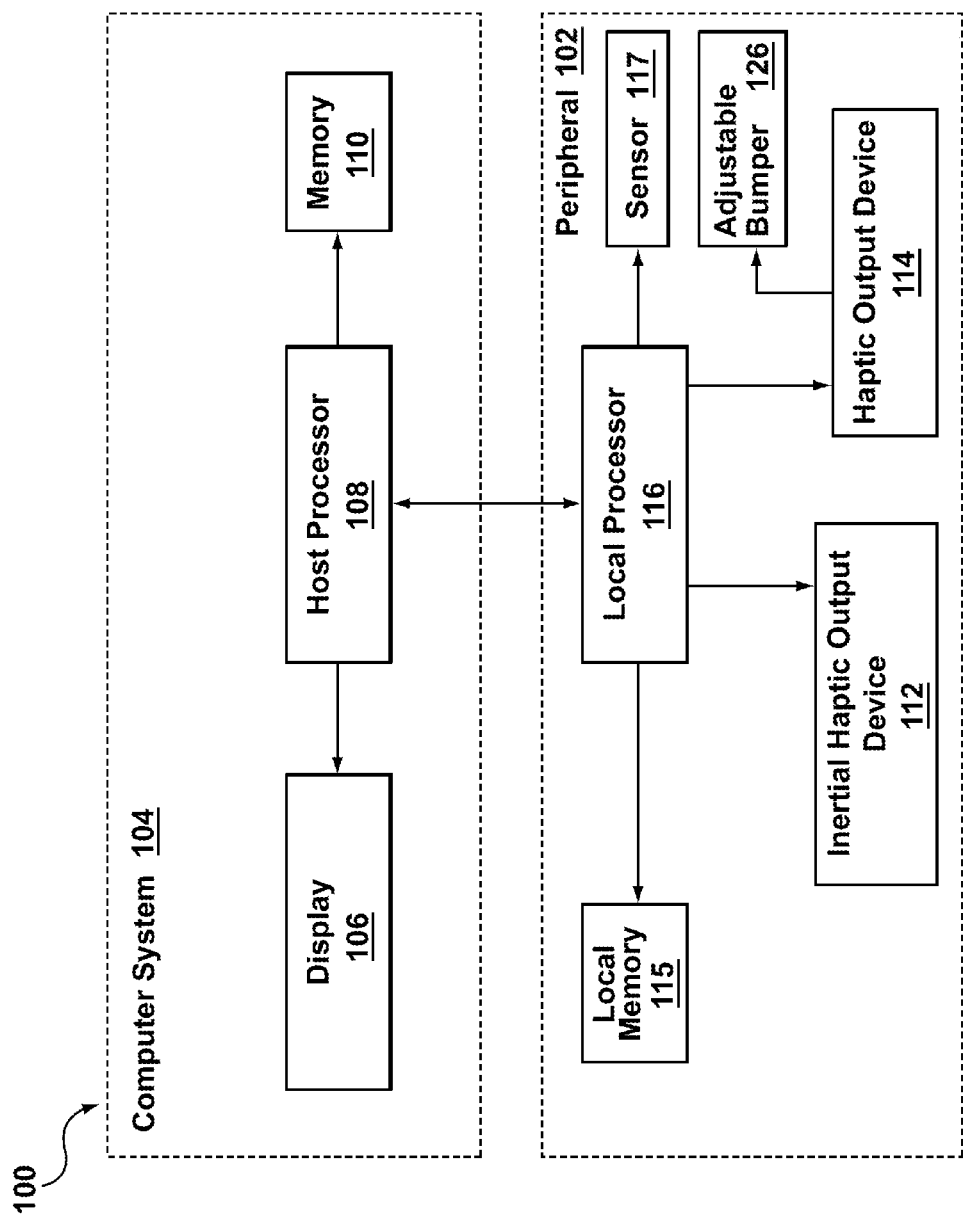
FIG. 2 is a block diagram of the system of FIG. 1.

Embodiments of the present invention provide systems and methods for providing haptic effects or feedback to a haptic peripheral. More particularly, referring now to the drawings, FIGS. 1-2 illustrate an embodiment hereof of a haptic feedback system 100 for providing haptic feedback to a haptic peripheral 102 that includes a manipulandum or user input device 118 which can move in one or more degrees of freedom. In this embodiment, manipulandum 118 is a haptic analog joystick. Although FIGS. 1-2 illustrate a haptic joystick as the manipulandum of the haptic peripheral, it will be understood by one of ordinary skill in the art that the present disclosure is not limited to a joystick manipulandum, but also includes any devices moveable in, either in whole or in part, one or more degrees of freedom. Those skilled in the art would recognize that the haptic joystick is merely an exemplary embodiment of a manipulandum of a controller, and that manipulandums with other configurations such as triggers, buttons, or other user input elements may be used. In addition, haptic peripheral 102 may have other controller configurations, shapes, and/or sizes such as but are not limited to devices in a form similar to traditional video game controllers, including but not limited to controllers such as a Wii™ remote or Wii™ U Controller, Sony® SixAxis™ controller or Sony® Wand controller, as well as controllers shaped as real life objects (such as tennis rackets, golf clubs, baseball bats, and the like) and other shapes.

Haptic peripheral 102 is in communication with a host computer or computer system 104. Host computer 104 may include a video game console, mobile device, or any other type of computer system that contains a processor. As shown in the block diagram of FIG. 2, host computer 104 includes a host processor 108, a memory 110, and a display 106. Host computer 104 executes a software application that is stored in memory 110 and executed by host processor 108. Host processor 108 may be any type of general purpose processor, or could be a processor specifically designed to provide haptic effect signals. Host processor 108 may be the same processor that operates the entire host computer 104, or may be a separate processor. Host processor 108 can decide what haptic effects to send to haptic peripheral 102 and in what order to send the haptic effects. Memory 110 may be any type of storage device or computer-readable medium, such as but not limited to random access memory (RAM) or read-only memory (ROM). Memory 110 may also be located internal to the host processor, or any combination of internal and external memory.

Host computer 104 is coupled to display 106 via wired or wireless means. Display 106 may be any type of medium that provides graphical information to a user; this includes but is not limited to monitors, television screens, plasmas, LCDs, projectors, or any other display devices. In an embodiment, host computer 104 is a gaming device console and display 106 is a monitor which is coupled to the gaming device console, as known in the art. In another embodiment, as known to those skilled in the art, host computer 104 and display 106 may be combined into a single device. It will also be understood by one of ordinary skill in the art that host computer 104 is not required to include a display and thus display 106 is an optional component. Further, in another embodiment, as known to those skilled in the art, host computer 104 may be physically located within haptic peripheral 102.

In the embodiment shown in FIG. 1, host computer 104 is in communication with haptic peripheral 102 through a wired or USB connection 103. However, in other embodiments, haptic peripheral 102 may communicate with host computer 104 using other wired communication or wireless communication means known to those of skill in the art. This can include but is not limited to a serial or Bluetooth connection.

Referring to FIG. 1, haptic peripheral 102 includes a housing or base 120 and manipulandum 118 extending from housing 120. Within housing 120, as shown in the block diagram of FIG. 2, haptic peripheral 102 includes a local processor 116, a local memory 115, a sensor 117, an adjustable bumper 126, an inertial haptic output device or first actuator 112, and a haptic output device or second actuator 114. Haptic peripheral 102 may be alternatively configured to not include local processor 116, whereby all input/output signals from haptic peripheral 102 are handled and processed directly by host computer 104. As will be explained in more detail herein, local processor 116 is coupled to inertial haptic output device 112 and haptic output device 114 to provide haptic effects thereto based on high level supervisory or streaming commands from host computer 104. Local processor 116 of the haptic peripheral is also coupled to sensor 117. Similar to host processor 108, local processor 116 also can decide what haptic effects to send and what order to send the haptic effects. In addition, local processor 116 can decide which haptic output device, i.e., inertial haptic output device 112 or haptic output device 114, will receive the haptic effect signal. In addition, similar to memory 110 of host computer 104, local memory 115 that can be any type of storage device or computer-readable medium, such as but not limited to random access memory (RAM) or read-only memory (ROM). Local memory 115 may also be located internal to the local processor, or any combination of internal and external memory.

As stated above, manipulandum 118 of haptic peripheral 102 may be physically moved within one or more degrees of freedom. For example, a user may move the manipulandum 118 forward, backwards, left or right. When a user moves manipulandum 118, sensor 117 detects the movement of the manipulandum and transmits a sensor signal to local processor 116. Local processor 116 then communicates or transmits the sensor signal to host computer 104. Based on the received sensor signal, host computer 104 performs actions within the video game and updates the graphical environment. Stated another way, the movement of manipulandum 118 of haptic peripheral 102 represents inputs from the user which allows the user to interact with the software applications running on host computer 104, including but not limited to video games relating to first person shooter, third person character interaction, vehicle related games, or computer simulations. The movement of manipulandum 118 may provide host computer 104 with input corresponding to the movement of a computer generated graphical object, such as a cursor or other image, or some other graphical object displayed by the host computer 104 via display 106, or to control a virtual character or gaming avatar, such as a person, vehicle, or some other entity that may be found in a game or computer simulation.

In addition to receiving sensor signals from sensor 117, local processor 116 also receives control signals from host computer 104 relating to haptic effects or actuator signals for inertial haptic output device 112 and haptic output device 114. If the control signal received by local processor 116 of haptic peripheral 102 relates to a vibration or detent, local processor 116 sends the control signal to inertial haptic output device 112 to provide the appropriate haptic effect. If the control signal received by local processor 116 of haptic peripheral 102 relates to a stiffness of the manipulandum, then local processor 116 sends the control signal to haptic output device 114 to modify a spring force acting on the manipulation. The spring force is a resistive force as the manipulandum is moved away from the rest or nominal position and is a restorative force as the manipulandum is moved back towards the rest or nominal position. In its original or unmodified state, each manipulandum or movable object of a controller has a predetermined resistive spring force acting thereon such that it takes a predetermined amount of force in order to move the manipulandum, either linearly or angularly, a predetermined amount away from a rest or nominal position. When the resistive spring force acting on the manipulation increases, the stiffness of the manipulandum increases such that the manipulandum has a "tighter" or "stiffer" feel. More particularly, when the stiffness of the manipulandum increases, an increased or greater amount of force is required to move the manipulandum the predetermined amount away from the rest or nominal position as compared to the amount of force required to move the manipulandum in the original or unmodified state. Conversely, when the resistive spring force acting on the manipulation decreases, the stiffness of the manipulandum decreases such that the manipulandum has a "looser" or "more flexible" feel. More particularly, when the stiffness of the manipulandum decreases, a decreased or lesser amount of force is required to move the manipulandum the predetermined amount away from the rest or nominal position as compared to the amount of force required to move the manipulandum in the original or unmodified state.

More particularly, depending on game actions and control signals received from host computer 104, local processor 116 may at times send a control signal to inertial haptic output device 112 to vibrate or cause some other transient haptic effect. Inertial haptic output device 112 may reside anywhere on or in haptic peripheral 102 to provide inertial haptic effects to the user. Haptic effects provided by inertial haptic output device 112 may include but are not limited to transient effects such as detents or vibrations. For example, when in operation, voltage magnitudes and durations are streamed from host computer 104 to haptic peripheral 102 where information is provided to inertial haptic output device 112 via local processor 116. Host computer 104 may provide high level commands to local processor 116 such as the type of haptic effect to be output (e.g. vibration, jolt, detent, pop, etc.) by inertial haptic output device 112, whereby local processor 116 instructs the inertial haptic output device 112 as to particular characteristics of the haptic effect which is to be output (e.g. magnitude, frequency, duration, etc.). Local processor 116 may retrieve the type, magnitude, frequency, duration, or other characteristics of the haptic effect from local memory 115 coupled thereto. Inertial haptic output device 112 may be a physical and/or a non-physical actuator. Possible physical actuators include but are not limited to eccentric rotating mass ("ERM") actuators, linear resonant actuators ("LRAs") in which a mass attached to a spring is driven back and forth, piezoelectric actuators, electromagnetic motors in which an eccentric mass is moved by a motor, vibrotactile actuators, inertial actuators, or other suitable types of actuating devices. Possible non-physical actuators include but are not limited to electrostatic friction (ESF), ultrasonic surface friction (USF), and other non-physical actuators.

Figure 3:
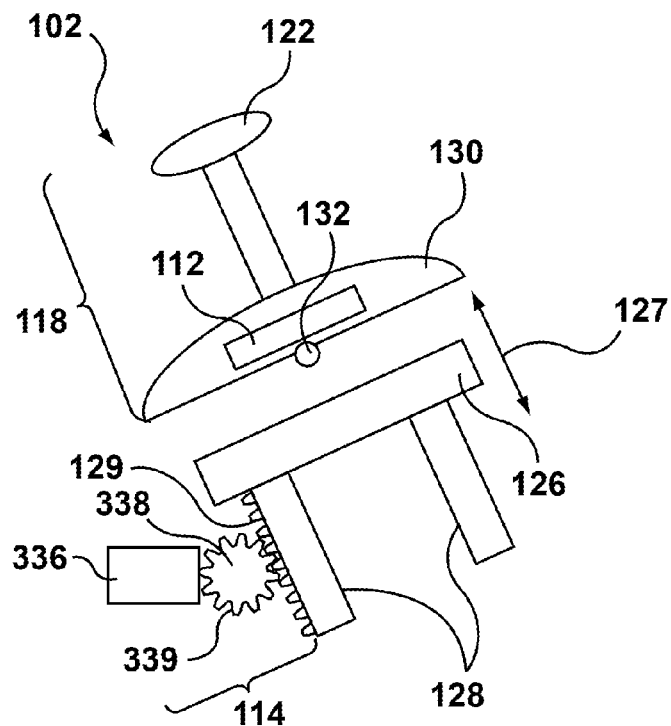
FIG. 3 is a schematic illustration of the haptic peripheral of FIG. 1, wherein a haptic output device of the haptic peripheral includes an adjustable bumper and the adjustable bumper is shown not in contact with the manipulandum.

In an embodiment hereof, as shown in FIG. 3, inertial haptic output device 112 may be mechanically fixed to the manipulandum 118 of haptic peripheral 102. Depending upon precise location of inertial haptic output device 112, haptic effects may be isolated to a target region of haptic peripheral 102, such as to a base end 130 of manipulandum 118 or a trigger end 122 of manipulandum. In FIG. 3, inertial haptic output device 112 is located within base end 130 of manipulandum 118 of haptic peripheral 102. A pivot point 132 of haptic peripheral 102 is found in the center of manipulandum 118. In this embodiment, a user would be able to move manipulandum 118 in any direction and with multiple degrees of freedom with respect to pivot point 132. A vibration isolation/dampening device (not shown) as described in U.S. patent application Ser. No. 14/078,478, filed Nov. 12, 2013 by the same inventor as the present invention, herein incorporated by reference in its entirety, may be utilized to isolate the haptic effects to a target region of haptic peripheral 102. With such isolated haptic effects, a relatively smaller actuator may be used as inertial haptic output device 112 at the target region of the haptic peripheral to provide the transient haptic effect.

Figure 3A:
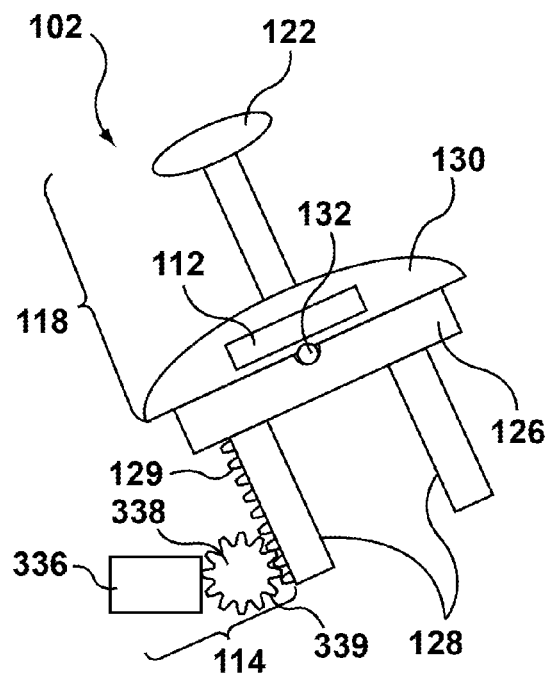
FIG. 3A is a schematic illustration of the haptic peripheral of FIG. 3, wherein the haptic output device of the haptic peripheral includes an adjustable bumper and the adjustable bumper is shown in contact with the manipulandum.

In addition to sending control signals to inertial haptic output device 112, depending on game actions and control signals received from host computer 104, local processor 116 may at times send a signal to haptic output device 114 to programmically change the spring force acting on manipulandum 118 of haptic peripheral 102, thereby increasing or decreasing the stiffness of the manipulandum such that the manipulandum has a "tight" or "stiff" feel as opposed to a "loose" or "flexible" feel depending on the current game actions or conditions. More particularly, with additional reference to FIG. 3 and FIG. 4 which shows a schematic illustration of haptic peripheral 102, haptic peripheral 102 includes adjustable bumper 126 that can be moved relative to manipulandum 118 via haptic output device 114 in order to increase or decrease the manipulandum's stiffness. Adjustable bumper 126 is a pad element that may be moved into various degrees of contact with manipulandum 118 via haptic output device 114. As shown in FIG. 3, when adjustable bumper 126 is not positioned in proximity to manipulandum 118 and manipulandum 118 does not contact adjustable bumper 126 during user operation thereof, the user will feel only an original or unmodified spring force acting on manipulation 118. When adjustable bumper 126 is moved into contact with manipulandum 118 as shown in FIG. 3A (or when adjustable bumper 126 is positioned in proximity to manipulandum 118 such that at least a portion of the manipulandum contacts the adjustable bumper during user operation thereof), the spring force acting on manipulation 118 felt by the user includes a combination of the original spring force acting on manipulation 118 and the force required to deform adjustable bumper 126. The spring force acting on manipulation 118 continues to increase as the adjustable bumper 126 is moved to be more in contact with manipulandum 118 due to the stiffness or material properties of adjustable bumper 126. Adjustable bumper 126 may be made of any type of material that would provide a spring force to the user. These materials include, but are not limited to, foam, rubber, silicon, or similar substances. These materials may or may not be deformable. In another embodiment, the adjustable bumper may be made of a non-deformable material but yet still provide a spring force through other type of mechanisms, such as a spring connected to the adjustable bumper. Haptic output device 114 is located near the target or movable portions of manipulandum 118 of haptic peripheral 102. As used herein, target or moveable portions of manipulandum 118 include the portion of the manipulandum which may be moved relative to housing 120 of haptic peripheral 102 by the user. In this embodiment, haptic output device 114 is located below base end 130 of manipulandum 118, near pivot point 132 of haptic peripheral 102.

In the embodiment of FIGS. 3 and 3A, adjustable bumper 126 is moved in a linear direction as indicated by directional arrow 127 along a track 128 during operation thereof. More particularly, adjustable bumper 126 is positioned beneath manipulandum 118 and is coupled to linear track 128. Adjustable bumper 126 and linear track 128 are coupled to haptic output device 114, which is grounded to housing 120 of haptic peripheral 102. When haptic peripheral 102 receives a haptic signal to modify the stiffness of the manipulandum, local processor 116 of haptic peripheral 102 sends a signal to haptic output device 114. Haptic output device 114 then either raises or lowers track 128 having adjustable bumper 126 coupled thereto in order to increase or decrease, respectively, the stiffness of the manipulandum. If haptic output device 114 is given a signal to increase the stiffness of the manipulandum, haptic output device 114 will raise track 128 and adjustable bumper 126 towards base end 130 of manipulandum 118 such that adjustable bumper 126 contacts base end 130 during user operation of manipulandum 118 or the amount of contact between adjustable bumper 126 and base end 130 is increased. Similarly, if haptic output device 114 is given a signal to decrease the stiffness of the manipulandum, haptic output device 114 will lower track 128 and adjustable bumper 126 away from base end 130 of manipulandum 118 such that adjustable bumper 126 does not contact base end 130 during user operation of manipulandum 118 or the amount of contact between adjustable bumper 126 and base end 130 is decreased. Depending upon the control signal and the target stiffness, haptic output device 114 may move the adjustable bumper the maximum distance away from manipulandum 118 or move the adjustable bumper to press against manipulandum 118 through base end 130 of the manipulandum. In one example, the maximum distance away would mean that the adjustable bumper would not contact or ever be in contact with manipulandum 118 during user operation of the manipulandum through base end 130 no matter the movable degree of freedom of manipulandum 118. In another example, the adjustable bumper may be pressed against base end 130 of the manipulandum so close as to inhibit manipulandum 18 from any motion and thus have a mobility of zero degrees of freedom.

As an illustrative example, if a user is controlling a vehicle and that vehicle transitions from a smooth surface (such as an icy ground in a video game) to a more dense surface (such as a muddy ground in a video game), the associated haptic effect might increase the stiffness of manipulandum 118. In other words, manipulandum 118 may have been very smooth and easy to move while on the icy surface will become much harder to move while on the muddy surface. In this example, the signal received by local processor 116 may relate to haptic effects that are created as a result of moving adjustable bumper 126 and thus the signal would be sent to haptic output device 114 in order to move adjustable bumper 126 into contact with or increase contact with manipulandum 118 as appropriate.

In another illustrative example, a user may be in a game and switch from a small car with very good handling to a larger tank with poor handling. In this example, the associated haptic information may be to change manipulandum 118 from a fluid motion with a large degree of freedom in movement to a more resistive motion with a smaller degree of freedom in movement. Local processor 116 in this example may send a signal to haptic output device 114 in order to move adjustable bumper 126 into contact with or increase contact with manipulandum 118 as appropriate.

In the embodiment of FIG. 3, haptic output device 114 includes a DC motor 336 and a gear 338 for moving track 128 and adjustable bumper 126 coupled thereto. More particularly, teeth or cogs 339 of gear 338 (which is a rotating component) mesh with mating teeth or cogs 329 formed on linear track 128 (which is a non-rotating component) in order to produce translation or linear movement of track 128. Although shown with one gear, two or more gears may be included within the haptic output device in order to produce a mechanical advantage through a gear ratio. In addition, although shown with a DC motor, haptic output device 114 may include a different actuator such as but not limited to a motor other than a DC motor. Further, as will be described in relation to FIG. 4 below, haptic output device 114 may be made of smart materials such as, but not limited to, piezoelectric, electro-active polymers and shape memory alloys, or any other haptic substrate and flexible or deformable surfaces that provide projected haptic output such as a puff of air using an air jet, and the like. In the embodiment of FIG. 3, haptic output device 114 is configured to raise and lower track 128 and thereby raise and lower adjustable bumper 126 coupled to the track, but in another embodiment hereof (not shown), the haptic peripheral may be configured such that the track is stationary and the haptic output device 114 raises or lowers the adjustable bumper along the track. Further, in the embodiment of FIG. 3, haptic output device 114 is configured to move adjustable bumper 126 in a linear direction, but in another embodiment hereof (not shown), the haptic peripheral may be configured to move the adjustable bumper in other directions such as but not limited to an arc or curve.

Figure 4:
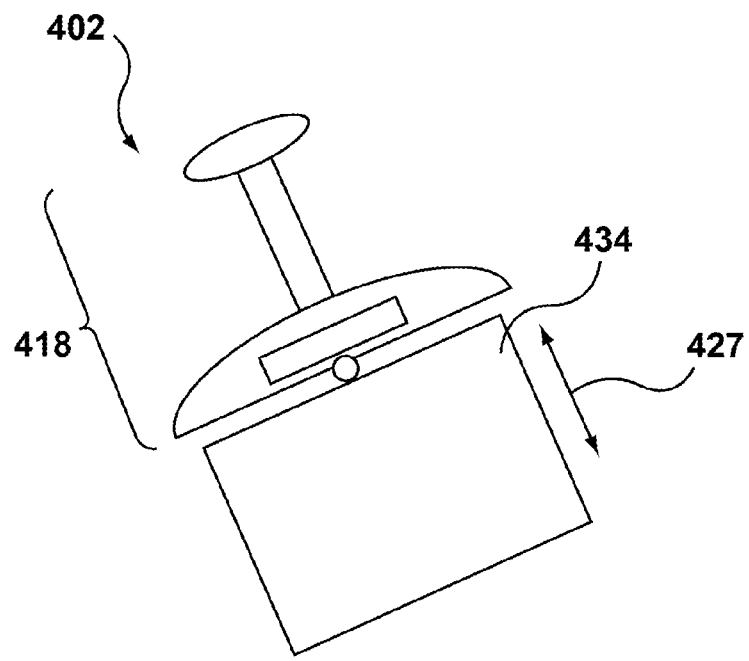
FIG. 4 is a schematic illustration of a haptic peripheral according to another embodiment hereof, wherein a haptic output device of the haptic peripheral is an electroactive polymer.

FIG. 4 illustrates another embodiment of a haptic peripheral 402. In this embodiment, the adjustable bumper and the haptic output device are combined into a single element or component, such as an electroactive polymer 434. Similar with the functionality described above, when the local processor of the haptic peripheral receives a signal to modify stiffness of the manipulation, a power is applied to electroactive polymer 434 to cause the electroactive polymer to either expand or contract from manipulandum 418 in a linear direction as indicated by directional arrow 427. Similar to the above description, electroactive polymer 434 can be expanded to increase the stiffness of manipulandum 418 or it can be contracted to decrease the stiffness of manipulandum 418.

Figure 5:
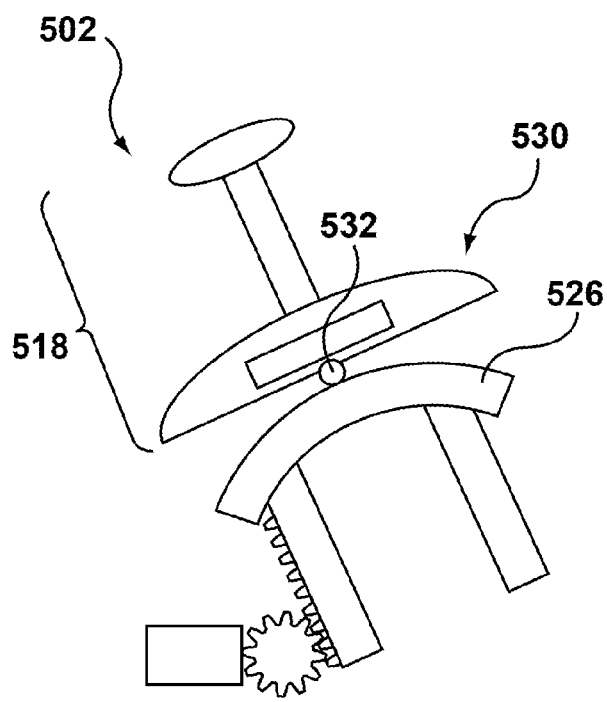
FIG. 5 is a schematic illustration of a haptic peripheral according to another embodiment hereof, wherein a haptic output device of the haptic peripheral includes an adjustable bumper having a curved configuration.

FIG. 5 illustrates another embodiment of a haptic peripheral 502. In this embodiment, adjustable bumper 526 has a curved configuration. During user operation of the manipulandum, manipulandum 518 may pivot relative to pivot point 532 and as a result, base 530 of manipulandum 518 may tilt. Accordingly, in order to ensure that the spring force acting on manipulandum is linear, adjustable bumper 526 has a curved configuration in which a center portion thereof is positioned beneath or under pivot point 532 and the ends thereof are positioned slightly spaced apart from base 530 of manipulandum 518. When a user operates manipulandum 518 and the manipulandum tilts, the amount of contact between base 530 and adjustable bumper 526 is uniform or consistent so that the spring force resulting from contact between the manipulandum and the adjustable bumper is linear. Stated another way, in the embodiment of FIG. 5, the stiffness of manipulandum 518 remains constant, or does not vary, as the user continues to move it away from its center or nominal position. Conversely, in the embodiment of FIGS. 3 and 3A, when a user operates manipulandum 118 and the manipulandum tilts, the amount of contact between base 130 and adjustable bumper 126 increases with the tilt or incline of manipulandum so that the spring force resulting from contact between the manipulandum and the adjustable bumper increases as the manipulandum moves away from its center or nominal position. Stated another way, in the embodiment of FIGS. 3 and 3A, manipulandum 118 feels stiffer as the user continues to move it away from its center or nominal position. Although the embodiments of FIGS. 3, 4, and 5 illustrative how the stiffness of the manipulandum is modified with respect to one degree of freedom, it will be understood by those of ordinary skill in the art that any embodiment hereof may be modified to programmically control or change the stiffness of the manipulandum in two or more degrees of freedom.

Embodiments hereof thus utilize at least two separate or decoupled actuators or haptic output devices in order to provide complete or full haptic feedback to the haptic peripheral. The first actuator or haptic output device of the haptic peripheral functions to programmically change the spring force acting on a manipulandum of the haptic peripheral, thereby increasing or decreasing the manipulandum's stiffness, while the second actuator or inertial haptic output device of the haptic peripheral functions to provide inertial haptic effects to the user, such as but not limited to transient effects such as detents or vibrations. Collectively, the two actuators or haptic output devices, i.e., haptic output device 114 and inertial haptic output device 112, provide the user with a full haptic experience. One benefit of a programmable haptic peripheral that utilizes the two separate actuators or haptic output devices as described in embodiments hereof is that the programmable haptic peripheral exhibits a feature set similar to a full kinesthetic joystick but at a much reduced cost, smaller volume, and reduced power consumption. Full kinesthetic joysticks continuously consume power in order to provide haptic effects to the manipulandum. However, a programmable haptic peripheral that utilizes the two separate actuators or haptic output devices as described above only consumes power when the spring force acting on a manipulandum needs to be changed or adjusted. Stated another way, with respect to a programmable haptic peripheral according to embodiments hereof energy is only required from the actuator when the spring force is being changed as opposed to a full kinesthetic joystick in which power or energy is directly or continuously supplied to render the haptic effects relating to the manipulandum. As such, a programmable haptic peripheral according to embodiments hereof has relatively lower power requirements, thereby reducing cost, volume, and power consumption. In addition, the size of the actuators utilized in embodiments hereof are relatively smaller and less expensive than those utilized in full kinesthetic joysticks as they require less peak power to be delivered.

Figure 6:
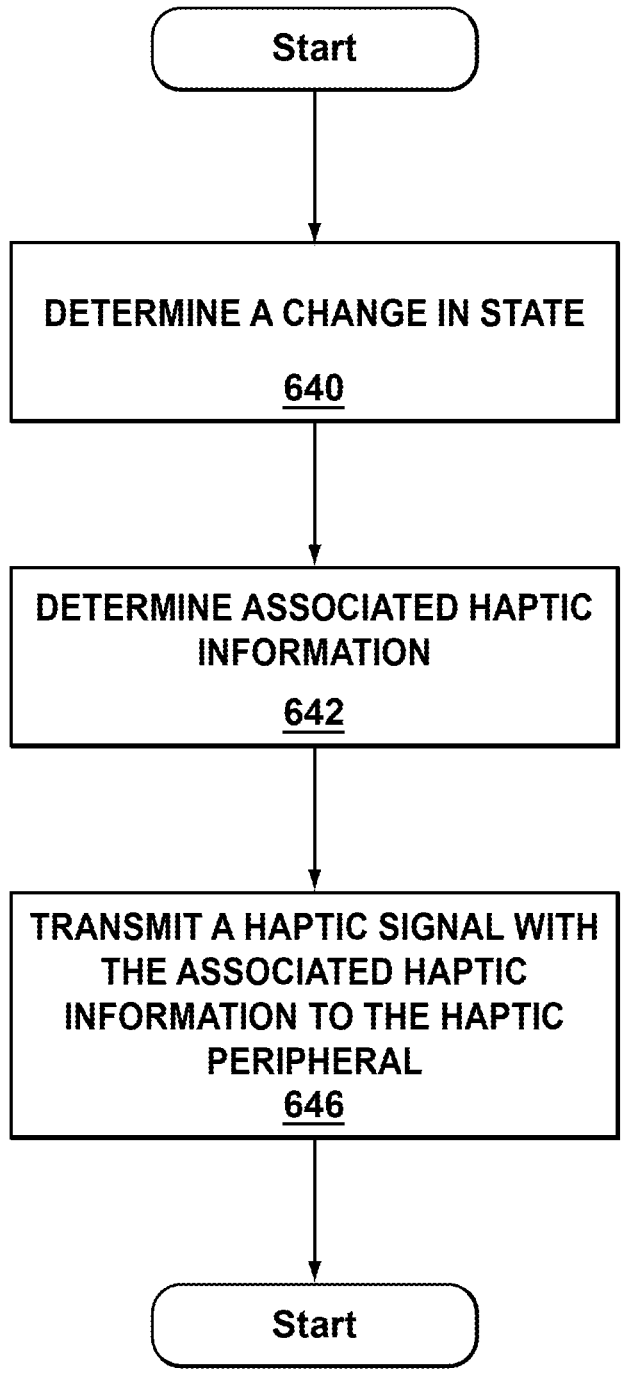
FIG. 6 is a flow chart illustrating a method for determining and transmitting a haptic signal from a host device according to an embodiment hereof.

FIG. 6 is a flow diagram for producing a haptic effect signal from the host computer system according to one embodiment of the present invention. In an embodiment, the functionality of the flow diagram of FIG. 6 is implemented by software stored in memory 110 of host component 104 and executed by host processor 108, and/or memory 115 of haptic peripheral 102 and executed by local processor 116. In other embodiments, the functionality may be performed by hardware through the use of an application specific integrated circuit ("ASIC"), a programmable gate array ("PGA"), a field programmable gate array ("FPGA"), or any combination of hardware and software.

At step 640, the computer system determines that there is a change in state. In one embodiment, this change can be a change in a virtual space for a game or a simulation. As an example, a user could be moving a character in a 2D environment. If the character collides with an object, the state of the character has changed. In another scenario, the computer controlled character may be moving across different surfaces, from a muddy surface to an icy surface, in this instance when the character moves from one surface to a different surface; the state of the character has changed. In another example, a user could be moving or controlling a character or other graphical object and the virtual environment in which that character or other graphical object is in has changed, such as sunny weather to thunder storm or snow storm, or calm environment to an explosion, such a change would also be a change in state.

In yet another embodiment, the change in state can be a change in the physical nature of host computer 104. As an example, host computer 104 can be a remote control vehicle. If the vehicle were to collide with a physical object, there would be a change in state to the vehicle. In addition if the vehicle were to move from one surface to a different surface, with a varying difference in texture, that would also be a change in state. One of ordinary skill in the art would understand that a change in state are not limited to the examples stated above.

At step 642, the computer system then determines whether there is an associated haptic effect with the change in state. For example, in the scenario of a user controlling a virtual character and that character colliding with a virtual object, that collision could have an associated haptic effect, such as a vibration. In another example, if the user controlled character is moving from an icy surface to a muddy surface the haptic effects could be a vibration, short detents, or an increase in the spring force acting on a manipulandum. In this example, moving the movement of the manipulandum would be relatively smooth when on the icy surface but then suddenly much more difficult to move when on the muddy surface.

The process of determining whether there is an associated haptic effect with the change of state can be done in a multiple ways. In one embodiment, host computer 104 accesses a pre-defined mapping of change of state and haptic effects. If it is determined that the change of state has an associated haptic effect, then a haptic signal will be sent. If it is determined that the change of state does not have an associated haptic effect, then no haptic signal will be sent. In another embodiment, the host computer 104 may utilize other factors, to determine whether there is an associated haptic effect. These factors may be but are not limited to sound, video, time, or user information such as heart rate, grip strength, and other biological information. As an example, if the sound data is above or below a certain threshold, a haptic effect mapped to that sound will be created and associated with that change in state.

At step 644, host computer 104 transmits the haptic information to haptic peripheral 102 using a haptic signal. The transmission of the haptic information can be done either through wired or wireless communication, as previously described.

Figure 7:
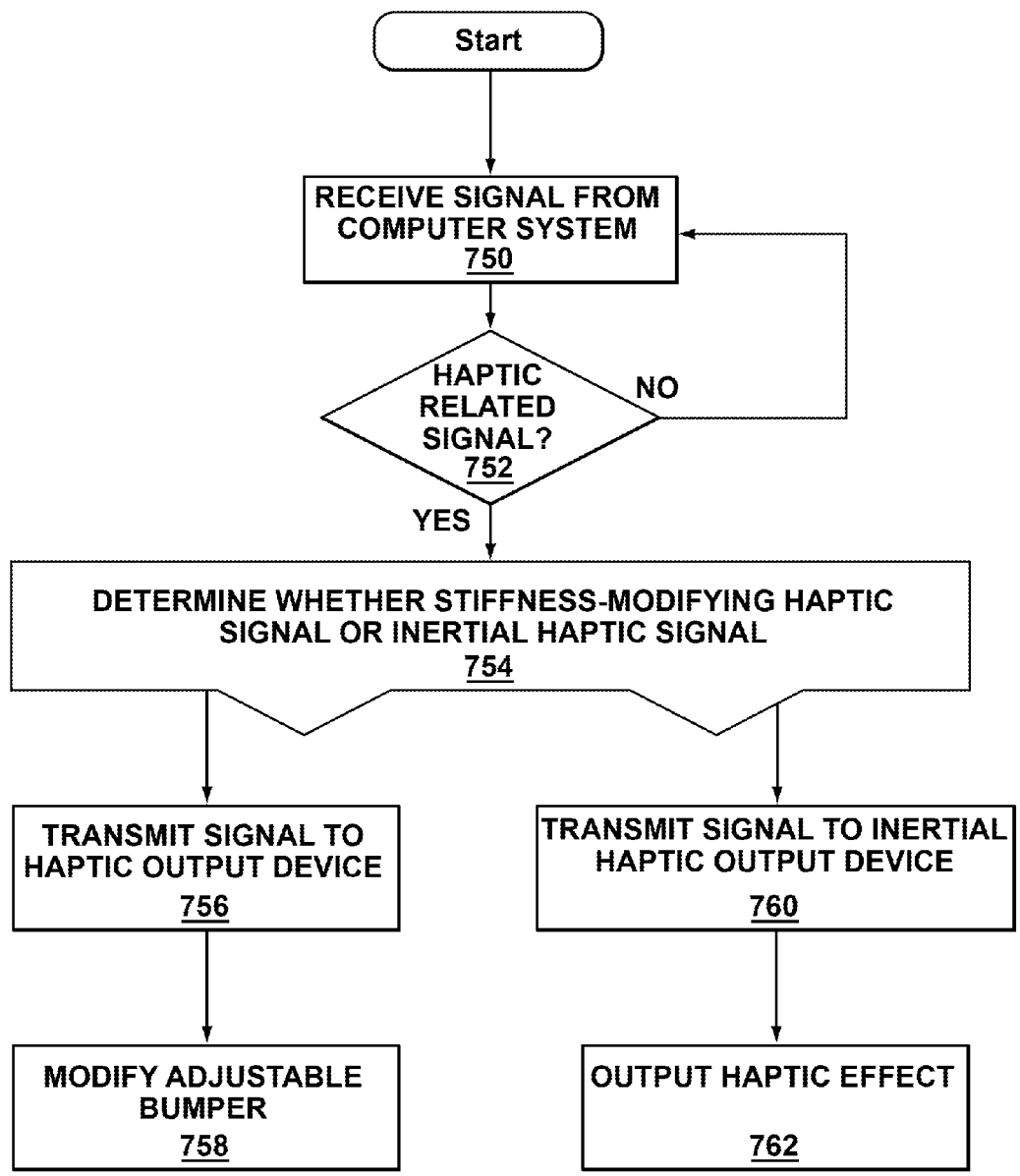
FIG. 7 is a flow chart illustrating a method for providing haptic effects to a user of a haptic peripheral according to an embodiment hereof.

FIG. 7 is a flow diagram for receiving haptic information from a host computer system and applying a haptic effect to a haptic peripheral, according to one embodiment of the present invention. In an embodiment, the functionality of the flow diagram of FIG. 7 is implemented by software stored in memory 110 of host component 104 and executed by host processor 108, and/or memory 115 of haptic peripheral 102 and executed by local processor 116. In other embodiments, the functionality may be performed by hardware through the use of an application specific integrated circuit ("ASIC"), a programmable gate array ("PGA"), a field programmable gate array ("FPGA"), or any combination of hardware and software.

At step 750, the haptic peripheral receives a signal from host computer 104. Upon receiving the signal, local processor 116 then determines whether the signal is a haptic signal at step 752 or some other non-haptic related signal. If it is determined that the signal is not a haptic signal, local processor 116 continues to function without applying any haptic effect to the user and waits to receive another signal from the host. If it is determined that the signal is a haptic signal, local processor 116 then must determine which haptic output device the signal must be sent.

At step 754, local processor 116 must determine if the haptic related signal is a stiffness-modifying haptic signal or an inertial haptic signal. If the signal calls for the inertial haptic output device to provide a haptic effect to the user, then local processor 116 will send the signal to inertial haptic output device at step 760 and then the inertial haptic output device will output the instructed haptic effect at step 762. The haptic effects that are output by the inertial haptic output device can include but are not limited to varying degrees of vibrations, varying degrees of detents, or other types of haptic effects. As an illustrative example, if a user is controlling a character or some other graphical object and then encounters a collision in the virtual environment, the associated haptic effect might be a vibration. In this case, local processor 116 receives a signal indicating that haptic peripheral 102 should vibrate. As a result, local processor 116 sends the signal to the inertial haptic output device 112 to provide the appropriate haptic effect, which in this example is a vibration.

However, if the signal calls for the haptic output device to modify the adjustable bumper of the haptic peripheral, then local processor 116 will send the signal to the haptic output device at step 756 and then the haptic output device will modify the adjustable bumper at step 758 to modify the spring force acting on the manipulation. The spring force is modified by moving the position of the adjustable bumper either towards or away from the manipulandum in order to increase or decrease, respectively, the amount of contact with the manipulandum. The haptic output device will move the adjustable bumper into contact with or increase contact with to the manipulandum if it is determined that there should be an increase in the spring force acting on the manipulation. By increasing the amount of contact between the adjustable bumper and the manipulandum, it becomes harder, i.e., more force is required, for the manipulandum to move and the more degrees the manipulandum moves the greater the spring force. On the other hand, the haptic output device will decrease the amount of contact between the adjustable bumper and the manipulandum if it is determined that the spring force acting on the manipulation should be reduced. By doing this the user experiences are less resistant manipulandum as moving it in multiple degrees of freedom is easy.

In determining the type of haptic effects to be executed and provided to the user, high level haptic parameters or streaming values are generated in the software code and sent to a haptic engine (not shown) where they are processed and the appropriate voltage levels are generated for the actuators. This allows the haptic peripheral to provide the appropriate haptic feedback to the user and vary the amount or type of haptic feedback through the different voltage levels that are generated for the actuators. In addition, the gaming software and the haptic software can reside on the same processor or on multiple processors.

Figure 9:
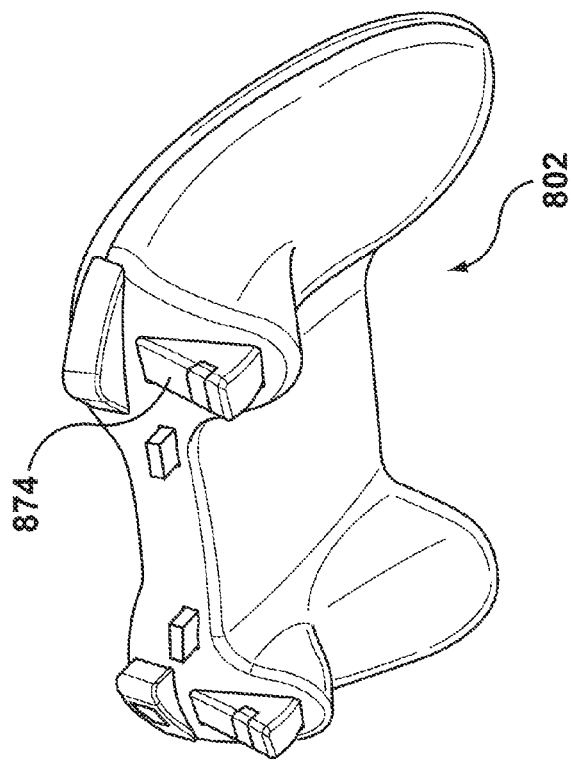
FIGS. 8 and 9 are perspective views of a haptic peripheral according to an embodiment hereof, wherein the haptic peripheral is a handheld gaming controller.
Figure 8:
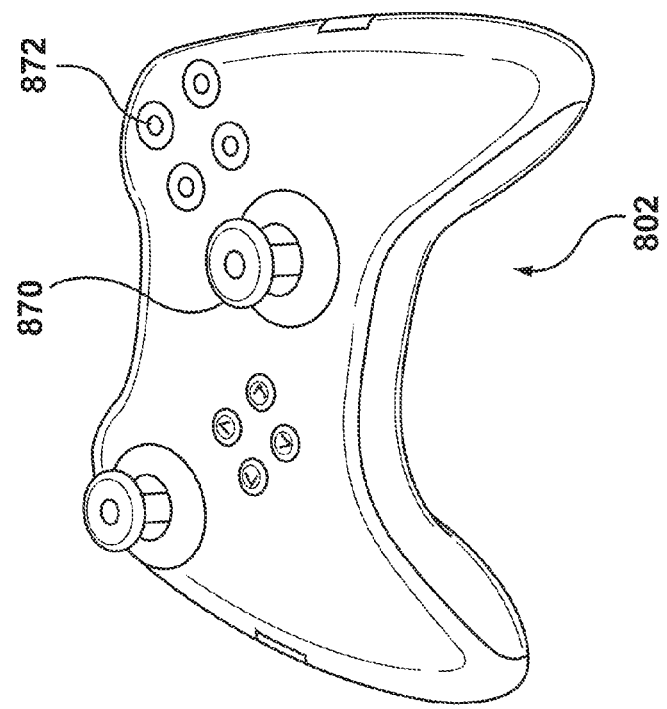

Several embodiments are specifically illustrated and/or described herein. However, it will be appreciated that modifications and variations of the disclosed embodiments are covered by the above teachings and within the purview of the appended claims without departing from the spirit and intended scope of the invention. For example, FIGS. 1-2 illustrate a haptic joystick as the single or only manipulandum of the haptic peripheral. However, those skilled in the art would recognize that the haptic joystick is merely an exemplary embodiment of a manipulandum and that manipulandums with other configurations, shapes, and sizes may be used. For example, FIGS. 8-9 illustrate a haptic peripheral 802 according to another embodiment hereof in which haptic peripheral 802 is a handheld gaming controller of similar shape and size to many "gamepads" currently available for video game console systems. A housing of haptic peripheral 802 is shaped to easily accommodate two hands gripping the device, either by a left-handed user or a right-handed user.

Figure 10:
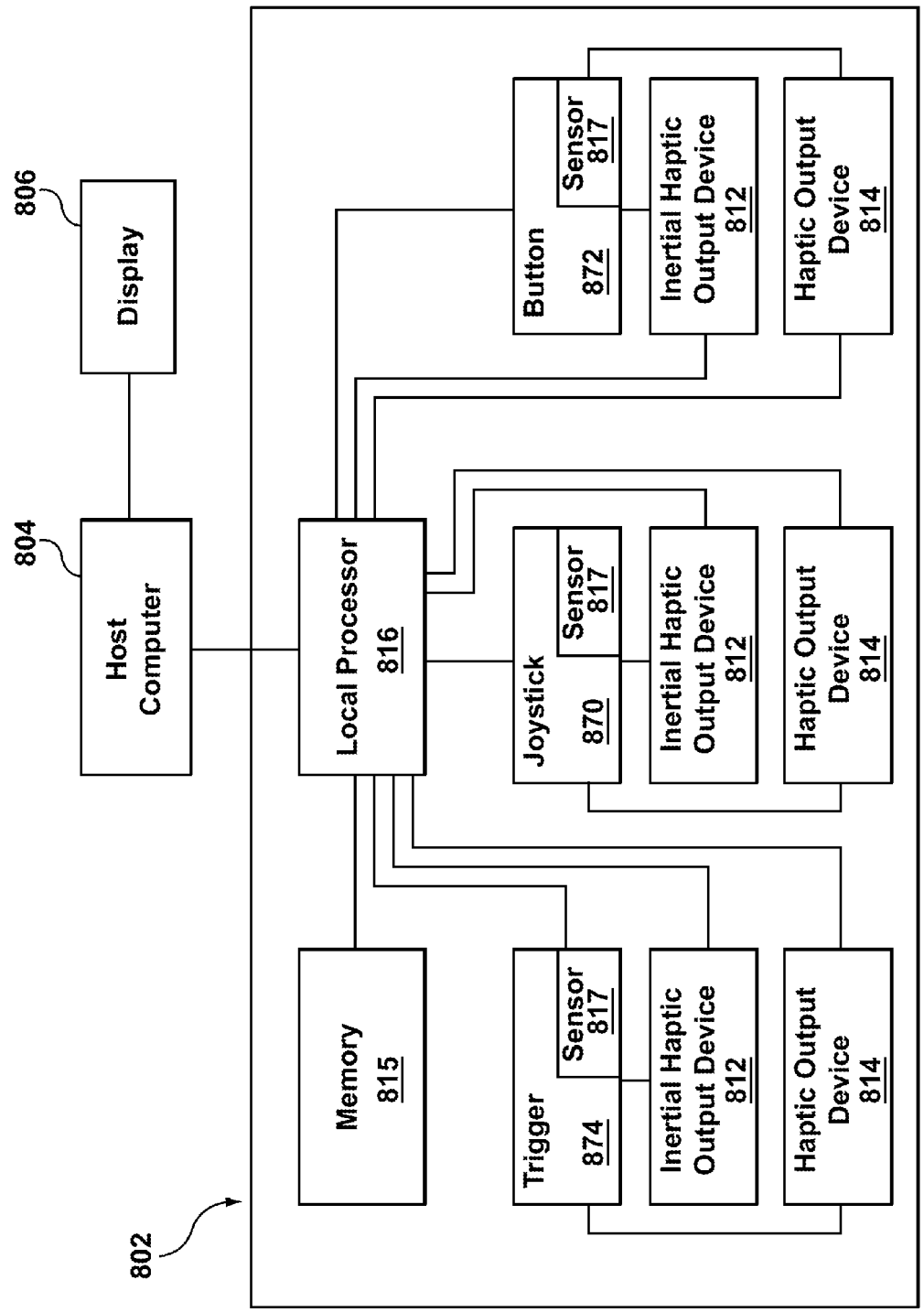
FIG. 10 illustrates a block diagram of the gaming controller of FIGS. 8-9.

As known to those skilled in the art, more than one type of manipulandum may be included on a haptic peripheral. Haptic peripheral 802 includes several types of manipulandums, including joysticks 870, buttons 872, and triggers 874. As shown in the block diagram of FIG. 10, haptic peripheral 802 also includes a local processor 816, a local memory 815 and each manipulandum thereof, i.e., each joystick 870, each button 872, and each trigger 874, includes a sensor 817 coupled thereto as well as two actuators, a first actuator or haptic output device 814 that functions to programmically change the spring force of the respective manipulandum and a second actuator or inertial haptic output device 812 that functions to provide inertial haptic effects such as but not limited to transient effects such as detents or vibrations to the user via the respective manipulandum. The block diagram of FIG. 10 shows only one (1) of each of joystick 870, button 872, and trigger 874. However, those skilled in the art would understand that multiple joysticks, buttons, and triggers, as well as other user input elements, may be used. Similar to haptic peripheral 102 and host computer 104, haptic peripheral 802 is coupled to and communicates with a host computer 804 having a display 806. Local processor 816 of haptic peripheral 802 is coupled to each inertial haptic output device and haptic output device to provide haptic effects thereto based on high level supervisory or streaming commands from host computer 804.

Figure 11:
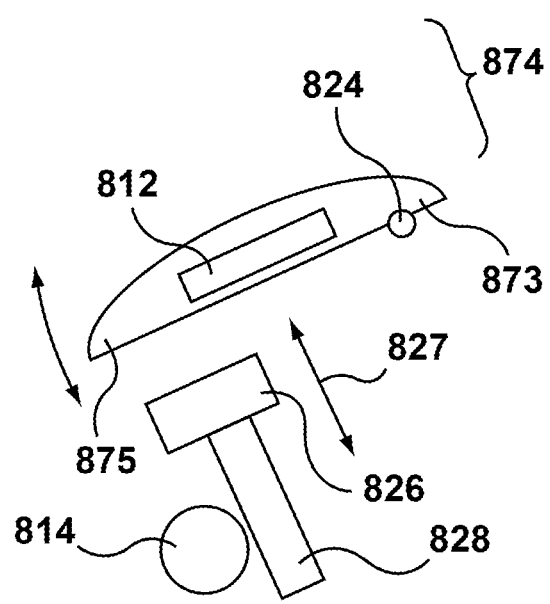
FIG. 11 is a schematic illustration of a trigger of the haptic peripheral of FIGS. 8 and 9, wherein a haptic output device of the haptic peripheral includes an adjustable bumper that is moved during operation thereof.

FIG. 11 is a schematic illustration of trigger 874 of the haptic peripheral of FIGS. 8-10. Trigger 874 may be moved in a degree of freedom around a pivot point 824 of the haptic peripheral. In this embodiment, inertial haptic output device 812 resides within trigger 874 at a first end 873 thereof. Thus, according to this embodiment, the haptic effects that are executed by inertial haptic output device 812 will be felt in the trigger. Further, in this embodiment, haptic output device 814, a linear track 828, and an adjustable bumper 826 are found below a second or opposing end 875 of trigger 874. Similar to haptic output device 114 described above with respect to FIG. 3, haptic output device 814 moves adjustable bumper 826 along linear track 828 as indicated by directional arrow 827 depending on a received haptic signal. As a result of this movement, the spring force acting on the trigger will either increase or decrease. When haptic peripheral 802 receives a haptic signal to modify the spring force acting on a manipulandum, local processor 816 of haptic peripheral 802 sends a signal to haptic output device 814. Depending on the signal instructions, haptic output device 814 then either raises or lowers adjustable bumper 826. If haptic output device 814 is given a signal to increase the spring force acting on a manipulandum, haptic output device 814 will raise adjustable bumper 826 towards trigger 874. Similarly, if haptic output device 814 is given a signal to decrease the spring force acting on a manipulandum, haptic output device 814 will lower adjustable bumper 826 away from trigger 874.

One of ordinary skill in the art would understand that any of the described mechanisms can be placed in different locations to provide similar type effects. As an example (not shown), haptic output device 814, linear track 828 and adjustable bumper 826 may be found above trigger 874 and facing the top portion of trigger 874. In this example, when a user presses on trigger 874, the end in which the user presses moves inward while the opposite end of the trigger, which is on the opposite side of pivot point 824 of the user pressed area, is moved in the opposite direction. Haptic output device 814, linear track 828, and adjustable bumper 826 may be found on this opposite end. This would also provide a similar spring force as the trigger depicted in FIG. 11.

Figure 12:
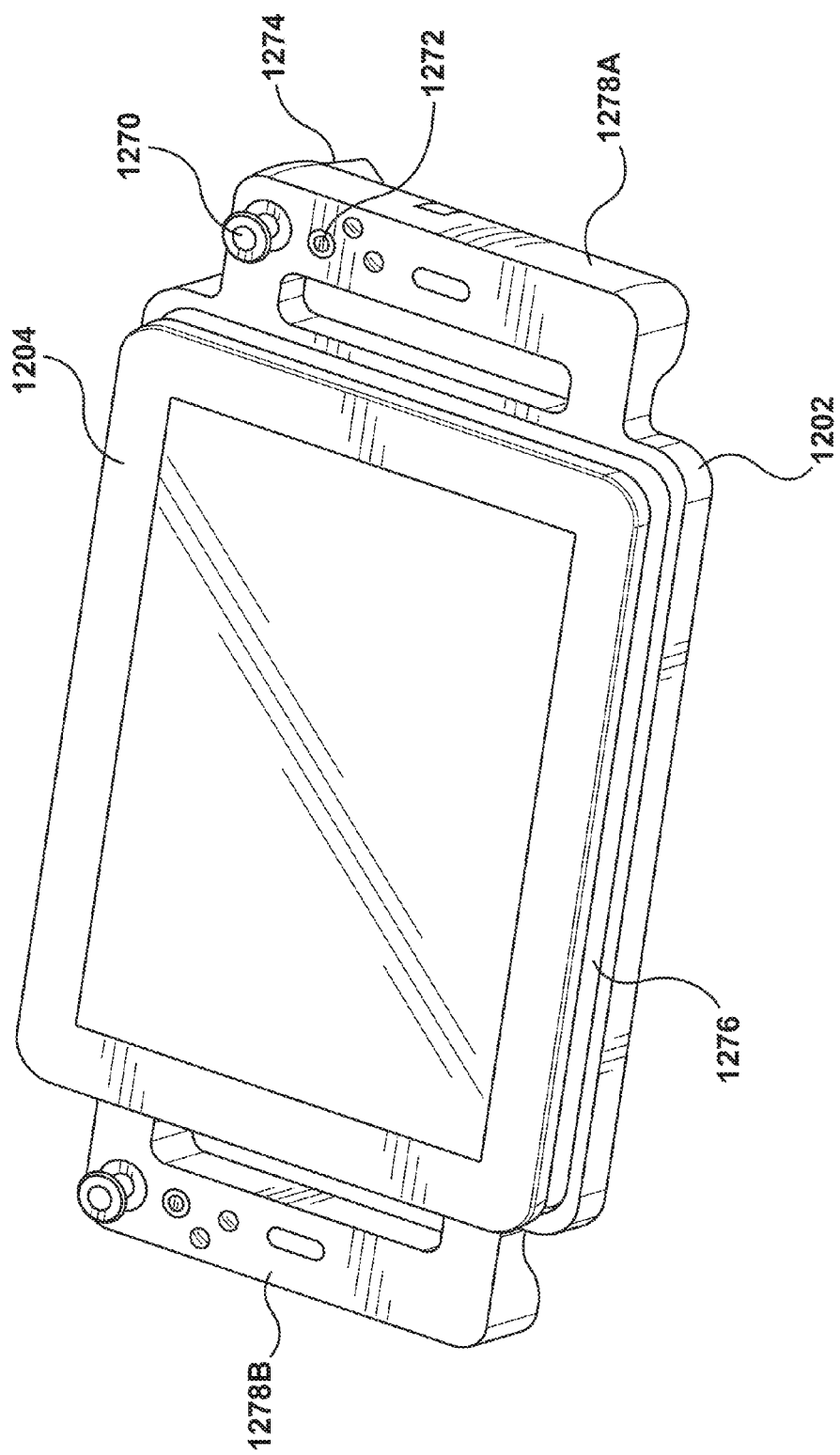
FIG. 12 is a perspective view of a system for providing haptic feedback to a haptic peripheral according to an embodiment hereof, wherein the haptic peripheral is a gaming tablet controller that may be used with a tablet computer.
Figure 13:
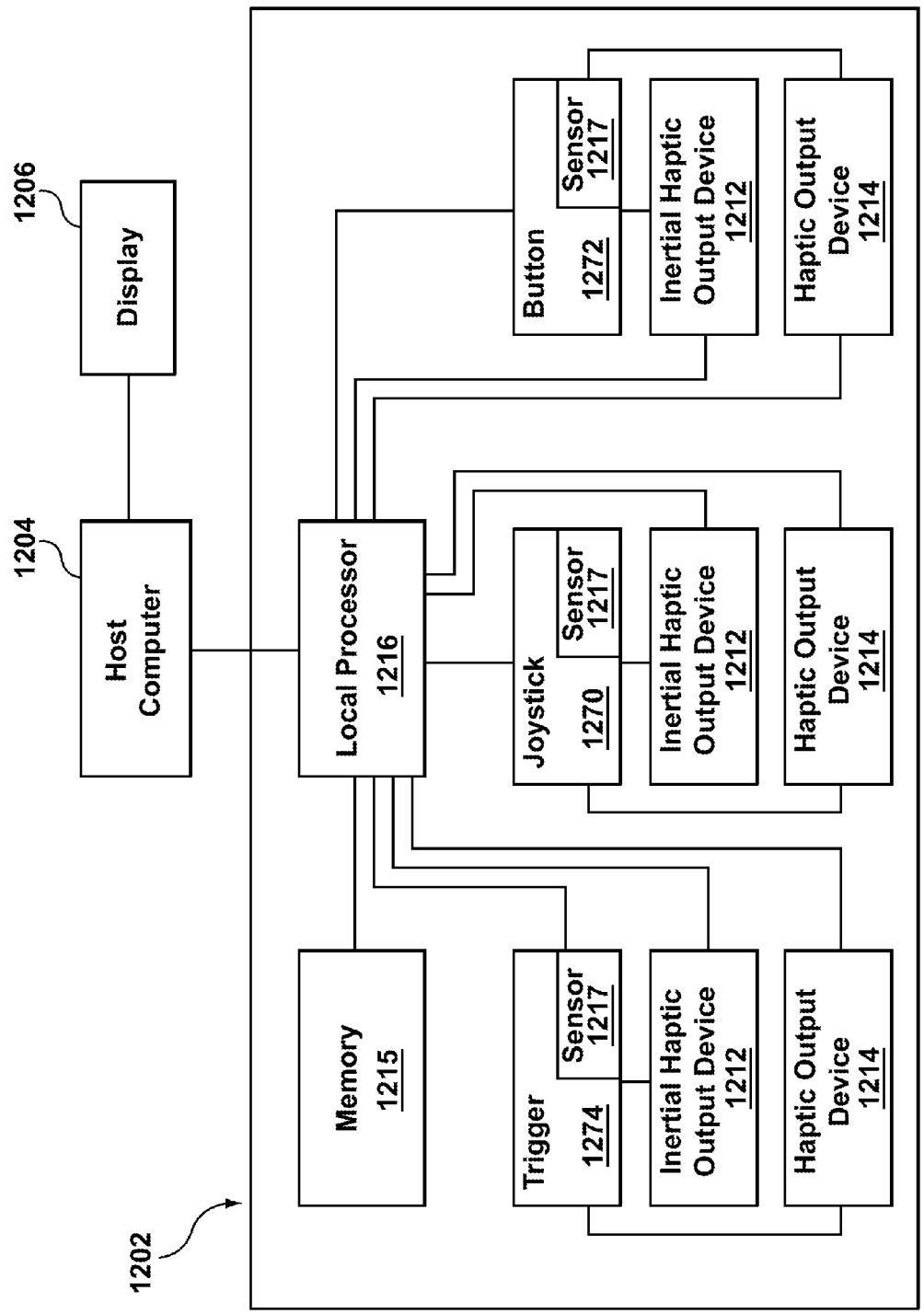
FIG. 13 illustrates a block diagram of the system of FIG. 12.

FIGS. 12-13 illustrate a haptic peripheral 1202 according to another embodiment hereof in which haptic peripheral 1202 is a gaming tablet controller that may be used with a tablet computer 1204. Tablet computer 1204 may be designed specifically for gaming activities, such as is available from Razer Inc., or may be a tablet computer well known and available in the market, such as an Apple® Ipad®, Kindle® Fire®, and Samsung® Galaxy Tab®. Haptic peripheral 1202 includes a docking portion 1276 configured to receive tablet computer 1204 and handles 1278A, 1278B with manipulandums disposed thereon for a user to control a game on tablet computer 1204. Docking portion 1276 connects haptic peripheral 1202 to tablet computer 1204 such that actions by the user on handles 1278A, 1278B, such as pressing buttons, moving joysticks, pressing triggers, etc., result in actions on the game being played on tablet computer 1004.

Handles 1278A, 1278B include typical manipulandums or user input elements found on controllers. The manipulandums will be described with respect to handle 1278A. However, those skilled in the art would recognize that the same or similar manipulandums may be used on handle 1278B. In particular, handle 1278A includes a joystick 1270, a button 1272, and a trigger 1274. As shown in the block diagram of FIG. 13, haptic peripheral 1202 also includes a local processor 1216, a local memory 1215 and each manipulandum thereof, i.e., joystick 1270, button 1272, and trigger 1274, includes a sensor 1217 coupled thereto as well as two actuators, a first actuator or haptic output device 1214 that functions to programmically change the spring force of the respective manipulandum and a second actuator or inertial haptic output device 1212 that functions to provide inertial haptic effects such as but not limited to transient effects such as detents or vibrations to the user via the respective manipulandum. Similar to haptic peripheral 102 and host computer 104, haptic peripheral 1202 is coupled to and communicates with tablet computer 1204. Local processor 1216 of haptic peripheral 1202 is coupled to each inertial haptic output device and haptic output device to provide haptic effects thereto based on high level supervisory or streaming commands from tablet computer 1204.

In other embodiments (not shown), the haptic peripheral has a manipulandum that can be moved up and down, perpendicular to the base of the haptic peripheral. In yet another embodiment (not shown), the haptic peripheral has a manipulandum that can be used to control a physical object or machine, such a vehicle or robotic device, through the host computer. In such embodiments, the host computer may not need a display to be operable. In addition, the host computer in this embodiment may be a separate entity to the user controlled physical object or machine or may be within the controlled physical object or machine. In another embodiment, the software applications running on host computer 104 can relate to software that controls physical objects, including but not limited to a remote control car or robotic arm. In this embodiment, the haptic peripheral communicates with the host computer similar to above. As the host computer receives these signals, the host computer performs actions with the physical object in accordance with the movement instructions.

While various embodiments according to the present invention have been described above, it should be understood that they have been presented by way of illustration and example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. An apparatus comprising:
a manipulandum movable in at least one degree of freedom;
an adjustable bumper; and
a haptic output device coupled to the adjustable bumper, wherein the haptic output device is configured to receive a control signal from a processor and is configured to move the adjustable bumper relative to the manipulandum to an adjustment position in order to modify a stiffness of the manipulandum, wherein power is only required to move the adjustable bumper such that when power is not provided, the adjustable bumper remains in the adjustment position.

2. The apparatus of claim 1, wherein the stiffness of the manipulandum is modified by changing the amount of contact between the adjustable bumper and the manipulandum.

3. The apparatus of claim 2, wherein the adjustable bumper is deformable and/or wherein the adjustable bumper is composed of one of foam, rubber, or silicone.

4. The apparatus of claim 1, wherein the haptic output device is configured to move the adjustable bumper in a linear direction in order to change the stiffness of the manipulandum.

5. The apparatus of claim 1, wherein the manipulandum is selected from the group consisting of a trigger and a joystick and/or wherein the manipulandum is configured to send a signal to the processor.

6. The apparatus of claim 1, further comprising an inertial haptic output device coupled to the manipulandum, wherein the inertial haptic output device is configured to receive a control signal from the processor and output a haptic effect to the manipulandum in response to the control signal from the processor.

7. The apparatus of claim 6, wherein the haptic effect output by the inertial haptic output device is a transient effect selected from the group consisting of a vibration or a detent.

8. A gaming system comprising:
a host computer;
a processor; and
a haptic peripheral including a manipulandum movable in at least one degree of freedom, an inertial haptic output device, and a haptic output device,
wherein the inertial haptic output device is coupled to the manipulandum and is configured to receive a control signal from the processor and output a transient haptic effect to the manipulandum in response to the control signal from the processor, and
wherein the haptic output device is configured to receive a control signal from the processor and is configured to move the adjustable bumper relative to the manipulandum to an adjustment position in order to modify a stiffness of the manipulandum, wherein power is only required to move the adjustable bumper such that when power is not provided, the adjustable bumper remains in the adjustment position.

9. The gaming system of claim 8, further comprising an inertial haptic output device, wherein the inertial haptic output device is coupled to the manipulandum and is configured to receive a control signal from the processor and output a transient haptic effect to the manipulandum in response to the control signal from the processor.

10. The gaming system of claim 8, wherein the processor is disposed in the host computer or wherein the processor is disposed in the haptic peripheral.

11. The gaming system of claim 8, wherein the manipulandum is selected from the group consisting of a trigger and a joystick.

12. A method of providing haptic feedback, comprising the steps of:
receiving a first control signal at a haptic peripheral, wherein the haptic peripheral includes a manipulandum movable in at least one degree of freedom and a haptic output device;
transmitting the first control signal to the haptic output device; and
modifying a stiffness of the manipulandum in response to the first control signal by moving an adjustable bumper relative to the manipulandum,
wherein when power is supplied to the haptic output device, the haptic output device moves the adjustable bumper relative to the manipulandum to an adjustment position in order to modify a stiffness of the manipulandum, wherein power is only required to move the adjustable bumper such that when power is not provided, the adjustable bumper remains in the adjustment position.

13. The method of claim 12, wherein receiving the haptic signal further comprises determining a spring force amount.

14. The method of claim 12, wherein the step of modifying the stiffness of the manipulandum includes moving the adjustable bumper in a linear direction relative to the manipulandum.

* * * * *